United States Patent Office 3,308,383
Patented Mar. 7, 1967

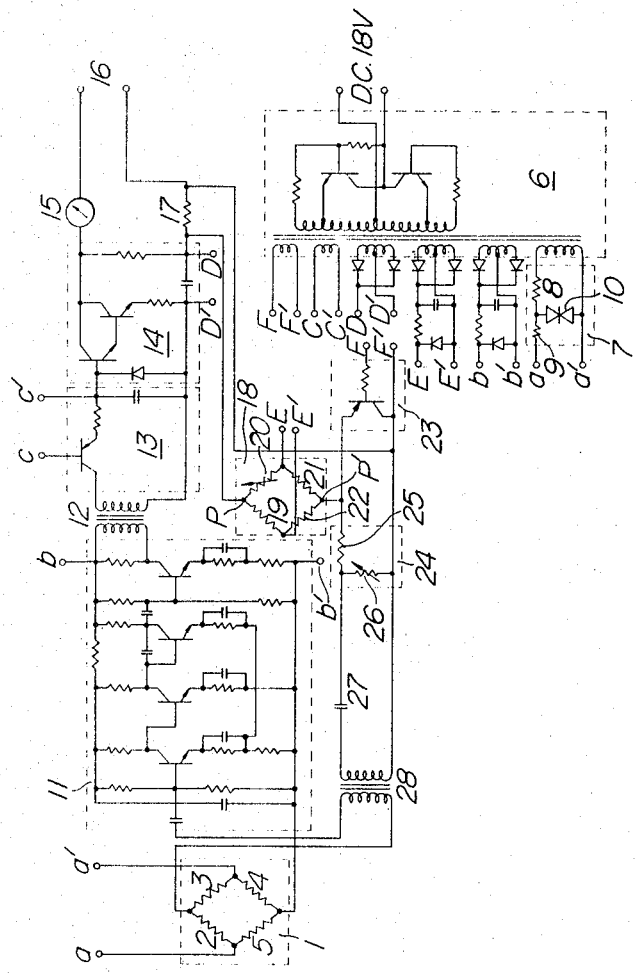

3,308,383
AMPLIFYING MEANS FOR USE WITH TRANS-
MISSION SYSTEMS WITH FEEDBACK MEANS
PROVIDING ERROR SIGNAL FOR AMPLIFIER
Toshio Kinoshita, Hideo Kondo, and Toshio Takahashi,
Katsuta-shi, Japan, assignors to Hitachi, Ltd., Tokyo,
Japan, a corporation of Japan
Filed Sept. 16, 1964, Ser. No. 396,861
Claims priority, application Japan, Sept. 16, 1963,
38/49,110; Sept. 30, 1963, 38/51,740
16 Claims. (Cl. 328—1)

This invention relates to devices for measuring process variables and more particularly to amplifying means for use with a transmission system in such devices in which a process variable such as pressure is taken out in the form of a resistance change in a bridge consisting of strain gauges bonded onto the surface of a Bourdon tube and is then converted into a milliampere signal current universally employed in an all-electronic process control system.

It has already been known in the art that the use of strain gauges in devices for measuring process variables can remarkably simplify the structure of the mechanical section therein. However, output voltage of the strain gauge is quite low or of the order of several millivolts and various problems generally arise in respect of insulation resistance of a transmission line and input impedance of a receiving instrument when the output voltage is transmitted intact, thus high-grade amplifiers have hitherto been required. A modulated-type negative feedback amplifier employing a mechanical chopper, for example, is commonly employed as such amplifier. The above-described amplifier, however, has been defective in its low reliability, difficulty to maintain and difficulty to insulate its output from input, in addition to complicated structure and high cost.

Recently, transistor choppers with low level drift have been developed and an attempt has been made to replace the mechanical chopper by the transistor chopper. Such attempt, however, has not yet been successful for the practical use of the transistor choppers since those of special type adapted for operation with low level input and having an excellent temperature characteristic are required and they involve difficulties in respect of cost as well as in a technical aspect.

Therefore, the primary object of the present invention is to provide improved amplifying means which is free from the drawbacks of the prior devices.

According to the present invention, there is provided amplifying means for use with a transmission system comprising a detecting bridge arranged for excitation by a square wave to generate an unbalance square wave voltage output, means including at least an A.C. amplifier and a synchronous rectifier for converting said unbalance square wave voltage into a D.C. output therefrom, means for obtaining a voltage proportional to said D.C. output, a chopper for converting said voltage into a square wave voltage, and means for effecting negative feedback of said square wave voltage to the input side of said A.C. amplifier, the balance between said negative feedback square wave voltage and said unbalance square wave voltage of said detecting bridge being an error signal for said A.C. amplifier.

According to the present invention, there is also provided amplifying means for use with a transmission system comprising a detecting bridge arranged for excitation by a square wave to generate an unbalance square wave voltage output, means including at least an A.C. amplifier, an insulating transformer and a synchronous rectifier for converting said unbalance square wave voltage into a D.C. output therefrom, means for obtaining a voltage proportional to said D.C. output, a chopper for converting said voltage into a square wave voltage, and means including an insulating transformer for effecting negative feedback of said square wave voltage to the input side of said A.C. amplifier, the balance between said negative feedback square wave voltage and said unbalance square wave voltage of said detecting bridge being an error signal for said A.C. amplifier.

There are other objects and particularities of the present invention which will become obvious from the following description with reference to the accompanying drawing, in which the sole figure is a circuit diagram of an embodiment of the present invention, and in which like numerals are used to designate like parts.

In the sole figure, reference numeral 1 denotes a detecting bridge consisting of strain gauges 2, 3, 4 and 5. A magnetic multivibrator 6 is provided to convert direct current at 18 volts into a square wave with a frequency of the order of 1 kilocycle per second to thereby excite the detecting bridge 1 by the square wave supplied thereto through power supply terminals $a$ and $a'$. A limiter 7 consisting of resistances 8 and 9 and a Zener diode 10 is interposed between the magnetic multivibrator 6 and the detecting bridge 1 in order to eliminate any fluctuation in the square wave output voltage of the magnetic multivibrator 6 and any influence thereof on temperature. An A.C. amplifier 11 is connected with the detecting bridge 1 to amplify an unbalance voltage appearing on the bridge 1 and the output from the amplifier 11 is admitted into a synchronous rectifier 13 through an insulating transformer 12. In the synchronous rectifier 13, the square wave voltage is rectified into direct current, which is then amplified by a D.C. amplifier 14 and is taken out of the system as a D.C. output through a meter 15 and output terminals 16. A resistance 17 is connected in series with the output terminals 16 to obtain a voltage proportional to the D.C. output. The D.C. amplifier 14 may be eliminated according to the nature of service intended.

A zero-adjusting bridge 18 consisting of resistances 19, 20, 21 and 22 is operative connected with the resistance 17 so that an unbalance D.C. voltage appearing across terminals P and P' of this bridge can be added to the voltage across the resistance 17. It is therefore possible to effect zero adjustment and zero suppression of the amplifier by suitably varying the value of the variable resistance 20. Subsequently, the D.C. voltage being the sum of the above-described D.C. voltages is subjected to chopping by a transistor chopper 23 to be converted into a square wave voltage. A range adjuster 24 consisting of resistances 25 and 26 is operatively connected with the transistor chopper 23 so as to effect voltage division of the square wave voltage and to effect range adjustment by varying the voltage division ratio. The divided portion of the square wave voltage is subjected to negative feedback through a choke condenser 27 and an insulating transformer 28 to the input side of the A.C. amplifier 11 and is subtracted in the form of square wave from the unbalance output voltage of the detecting bridge 1 to provide an error signal for the A.C. amplifier 11.

Driving powers for the amplifiers 11 and 14 and the adding bridge 18 are derived from the magnetic multivibrator 6 whose square wave output is rectified for supply to the amplifiers and the bridge through respective terminals b–b′, D–D′ and E–E′. The synchronous rectifier 13 and the transistor chopper 23 are excited by the square wave output voltage supplied in synchronous relation thereto from the magnetic multivibrator 6 through respective terminals c–c′ and F–F′.

From the foregoing description, it will be understood that the detecting bridge 1 is adapted for operation with a stable square wave voltage instead of being driven by direct current as has been the case with prior devices. This provides an advantage that direct amplification is made possible without using a chopper for operation at low level. Further, the arrangement including the transistor chopper 13 disposed in the negative feedback circuit to effect the square wave—square wave superposition at the input side of the amplifier 11 provides additional advantages that the gains of the amplifiers 11 and 14 and the efficiency of the synchronous rectifier 13 can be improved by an amount of negative feedback, that the output impedance as looked from the output terminals 16 can also be increased, and that any variation in the resistance of an output circuit connected with the output terminals 16 does not affect the output signal at all.

According to another feature of the present invention, direct current is converted into a square wave for negative feedback to the amplifier 11. Thus, the input side of the amplifier can easily be insulated from the output side by an insulating transformer and is free from being affected by grounding of the output side.

Further, the transistor chopper 23, which is adapted to chop a D.C. voltage at high level, need not be of high performance and high cost and is not affected by the tempearture characteristic peculiar to transistors. Thus, the use of such transistor chopper 23 is advantageous over a prior case wherein a chopper is used for operation at the low level input side. Moreover, the chopper 23 is adapted for operation at a driving frequency, for example, of about 1 kilocycle per second which is higher than a commercial frequency. This permits reduction in size of the circuit arrangement and also reduction of a ripple component in the output so that a filter for eliminating the ripple component in the output can almost be eliminated.

It will further be appreciated that capability of zero adjustment and range adjustment in the negative feedback circuit dispenses with any necessity of mechanical adjustment and capability of adjustment at high level provides an advantage in respect of performance as well as stability. Further, the presence of a non-linear element such as Zener diode in the negative feedback circuit makes possible to straighten the input-output characteristic of the system.

In the embodiment described above, the detecting bridge 1 consisting of the strain gauges has been cited by way of example. It will however be understood that the invention is in no way limited to such specific embodiment and a thermister resistance, for example, may be incorporated therein for the purpose of temperature measurement or an electrode may be used for the purpose of electrical conductivity measurement.

As described in detail in the foregoing, the amplifying means according to the present invention includes a detecting bridge driven by a square wave voltage and a transistor chopper disposed in a negative feedback circuit, and the arrangement is such that the balance between a square wave voltage subjected to negative feedback and an unbalance square wave voltage output from the detecting bridge forms an error signal for the amplifier. Thus, the invention attains an immense effect and has a great significance in this particular field of industry.

What is claimed is:

1. Amplifying means for use with a transmission system comprising a detecting bridge arranged for excitation by a square wave to generate an unbalance square wave voltage output, means including at least an A.C. amplifier and a synchronous rectifier for converting said unbalance square wave voltage into a D.C. output therefrom, means for obtaining a voltage proportional to said D.C. output, a chopper for converting said voltage into a square wave voltage, and means for effecting negative feedback of said square wave voltage to the input side of said A.C. amplifier, the balance between said negative feedback square wave voltage and said unbalance square wave voltage of said detecting bridge being an error signal for said A.C. amplifier.

2. Amplifying means for use with a transmission system according to claim 1, in which said means for effecting negative feedback of said square wave voltage includes therein a zero-adjusting network.

3. Amplifying means for use with a transmission system according to claim 1, further comprising a D.C. amplifier disposed on the output side of said synchronous rectifier.

4. Amplifying means for use with a transmission system according to claim 3, in which said means for effecting negative feedback of said square wave voltage includes therein a zero-adjusting network.

5. Amplifying means for use with a transmission system according to claim 3, in which said means for effecting negative feedback of said square wave voltage includes therein a range adjusting network.

6. Amplifying means for use with a transmission system according to claim 5, in which said means for effecting negative feedback of said square wave voltage includes therein a zero-adjusting network.

7. Amplifying means for use with a transmission system according to claim 1, in which said means for effecting negative feedback of said square wave voltage includes therein a range adjusting network.

8. Amplifying means for use with a transmission system according to claim 7, in which said means for effecting negative feedback of said square wave voltage includes therein a zero-adjusting network.

9. Amplifying means for use with a transmission system comprising a detecting bridge arranged for excitation by a square wave to generate an unbalance square wave voltage output, means including at least an A.C. amplifier, an insulating transformer and a synchronous rectifier for converting said unbalance square wave voltage into a D.C. output therefrom, means for obtaining a voltage proportional to said D.C. output, a chopper for converting said voltage into a square wave voltage, and means including an insulating transformer for effecting negative feedback of said square wave voltage to the input side of said A.C. amplifier, the balance between said negative feedback square wave voltage and said unbalance square wave voltage of said detecting bridge being an eror signal for said A.C. amplifier.

10. Amplifying means for use with a transmission system according to claim 9, in which said means for effecting negative feedback of said square wave voltage includes therein a zero-adjusting network.

11. Amplifying means for use with a transmission system according to claim 9, further comprising a D.C. amplifier disposed on the output side of said synchronous rectifier.

12. Amplifying means for use with a transmission system according to claim 11, in which said means for effecting negative feedback of said square wave voltage includes therein a zero-adjusting network.

13. Amplifying means for use with a transmission system according to claim 11, in which said means for effecting negative feedback of said square wave voltage includes therein a range adjusting network.

14. Amplifying means for use with a transmission system according to claim 13, in which said means for effecting negative feedback of said square wave voltage includes therein a zero-adjusting network.

15. Amplifying means for use with a transmission system according to claim 9, in which said means for effecting negative feedback of said square wave voltage includes therein a range adjusting network.

16. Amplifying means for use with a transmission system according to claim 15, in which said means for effecting negative feedback of said square wave voltage includes therein a zero-adjusting network.

No references cited.

ARTHUR GAUSS, *Primary Examiner.*

S. D. MILLER, *Assistant Examiner.*